3,253,991
PROPHYLAXIS AGAINST SMALLPOX AND TREATMENT OF VACCINIA WITH 1-METHYLISATIN β-THIOSEMICARBAZONE
Denis John Bauer and Peter William Sadler, London, England, assignors to Burroughs Wellcome & Co. (U.S.A.) Inc., Tuckahoe, N.Y., a corporation of New York
No Drawing. Filed Nov. 22, 1963, Ser. No. 325,790
3 Claims. (Cl. 167—65)

This application is a continuation-in-part of application Serial No. 73,559, filed December 5, 1960, now abandoned.

This invention relates to 1-substituted isatin β-thiosemicarbazones of Formula I, and a process for the treatment of pox virus infections comprising the administration in therapeutically acceptable form the host of such a 1-substituted isatin β-thiosemicarbazone of Formula I:

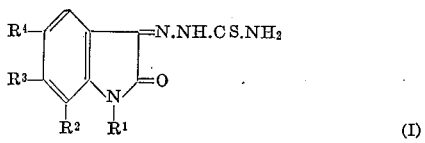

wherein $R^1$ is selected from the class consisting of the acetyl group, the alkyl, haloalkyl, hydroxyalkyl, alkenyl and alkynyl groups having not more than 5 carbon atoms, and the lower aliphatic acyloxyalkyl groups in which the alkyl group has not more than 5 carbon atoms, $R^2$ is selected from the class consisting of the hydrogen and halogen atoms and the methyl and ethyl groups, and $R^1$ and $R^2$ may form a trimethylene chain, and $R^3$ and $R^4$ are selected from the class consisting of the hydrogen and fluorine atoms, at least two of $R^2$, $R^3$ and $R^4$ being hydrogen atoms.

It has been found that certain 1-substituted isatin β-thiosemicarbazones of Formula I are highly active against infections of the vaccinia virus and the human smallpox (alastrim) virus in mice. Effective doses are well below the toxic level. Given orally to mice, a dose of about 5 mg./kg. or less gives protection against alastrim or vaccinia, while mice survive doses of at least 1000 mg./kg.

Especially active compounds include those of Formula I in which $R^1$ is a methyl, ethyl, allyl or 2-hydroxyethyl group and $R^2$, $R^3$ and $R^4$ are hydrogen atoms.

Certain compounds of Formula I, including those in which $R^1$ is a methyl, allyl or acetoxymethyl group and $R^2$, $R^3$ and $R^4$ are hydrogen atoms, appear to have an advantage over other compounds of Formula I, including those in which $R^1$ is an acetyl, ethyl, hydroxymethyl or 2-hydroxyethyl group and $R^2$, $R^3$ and $R^4$ are hydrogen atoms, in that the former compounds exert a virustatic effect while the latter compounds may retard the growth of virus without themselves stopping it.

The compounds of Formula I are made by converting a 1-substituted isatin of Formula II by known methods into its thiosemicarbazone.

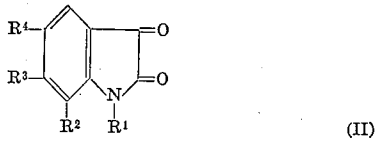

In this formula $R^1$, $R^2$, $R^3$ are as defined above.

Conveniently, the compound of Formula II is treated with thiosemicarbazide; the reaction may be carried out by heating equivalent molecular proportions of the two reagents together under reflux in a solvent, for example aqueous ethanol. The product of Formula I separates on cooling, and is collected and washed well. It may be recrystallized from a solvent, for example n-butanol.

For the treatment of pox virus infections, a compound of Formula I in therapeutically acceptable form is administered to the host. The compound may be presented in a pharmaceutical preparation, advantageously in discrete units, such as tablets, capsules, cachets, ampoules or suppositories, each containing a predetermined amount of the compound. It may also be presented as a powder or granules, as a solution or suspension in an aqueous, non-aqueous or emulsified liquid, or as an ointment. For parenteral use, the preparations must be sterile and are presented in sealed containers. The preparations of this invention may be made by any of the methods of pharmacy, and may include one or more of the following accessory ingredients: diluents, solutes, buffers, flavouring, binding, dispersing, surface-active, thickening, lubricating, and coating materials, preservatives, antioxidants, bacteriostats, suppository and ointment bases, and any other acceptable excipients.

It has also been discovered that the compounds of Formula I are more active against smallpox in man when they are presented in a very finely divided form. The most useful compounds in this respect are the following:

1-methylisatin β-thiosemicarbazone,
1-ethylisatin β-thiosemicarbazone,
1-allylisatin β-thiosemicarbazone,
1-hydroxymethylisatin β-thiosemicarbazone,
1-2′-hydroxyethylisatin β-thiosemicarbazone,
1-acetylisatin β-thiosemicarbazone,
5-fluoro-1-methylisatin β-thiosemicarbazone,
1-ethyl-5-fluoroisatin β-thiosemicarbazone,
1,7-trimethyleneisatin β-thiosemicarbazone, and
1,7-diethylisatin β-thiosemicarbazone.

The finely divided compound of Formula I desirably has a surface area per gram of at least 1.0 m.²/g. (one square meter per gram), preferably about 2–4 m.²/g. The latter value corresponds to a particle size of 1–2μ when expressed as a surface mean diameter. (A definition of surface mean diameter is given in British Standard 2955; in general terms it is the diameter of the sphere of the material that would have the same surface area per gram.)

The surface area per gram of the finely divided compound of Formula I can be measured by the usual techniques relying on well-known physical phenomena. These include measurements determining particle size using optical or electron microscopy, air permeability, sedimentation, elutriation, sieving, and electrical methods. Thus the surface area per particle can be calculated and thence (from a knowledge of the density of the material) the surface area per gram of the material.

When measuring the properties of crystalline and (especially) fibrous materials such as 1-methylisatin β-thiosemicarbazone, care must be taken that the measurements obtained can be used to give a true indication of the surface area per gram of the material. For example, a sieve may allow a long thin particle to pass through while retaining a more nearly spherical particle of smaller individual volume and weight, and measurements of air permeability may be confused by a tortuosity factor. Microscopy, with statistical evaluation of the measured dimensions of the particles, is one of the most suitable methods for comparing different physical forms.

The surface area per gram of a compound of Formula I may be increased by any of the usual techniques for obtaining material in a very finely divided state.

For example, if the compound of Formula I is dissolved in a solvent in which it is readily soluble and this solution is rapidly poured into another liquid in which the compound is sparingly soluble, microcrystals may be formed.

Alternatively the coarser material obtained by the usual chemical synthesis can be comminuted to a finer state of division, for example by means of a conventional ball, rod or tumbler mill (collectively referred to as a cylinder mill). To be used effectively a cylinder mill must be studied and if necessary modified to take into account the physical properties of the material actually being comminuted. Thus the amount of the material added to a mill of given dimensions, the number and size of the rods or balls added, the speed of rotation of the mill, lubrication problems such as wet or dry milling, and considerations of pressure and temperature (including cooling operations), may influence the final state of division of the particles. The optimum grinding conditions for a given batch of a compound of Formula I are determined by routine examination. Various modified forms of cylinder mill such as the biconical type, the spinning ball mill which exerts Coriolis forces in addition to centrifugal and gravitational force, and many others may also be used. Another method of comminuting the material is in the "fluid energy mill" which utilizes high velocity gaseous currents to enable the particles to grind each other in the way that natural wind and streams abrade rocks and sand down to fine dust. Yet another method of grinding utilizes vibration milling techniques; high frequency vibrations can produce particles of extremely small dimensions.

Conventional separating techniques play a useful part in obtaining the desired finely divided products. Thus sedimentation, sieving and elutriation techniques can be used to remove coarser particles, subject (as mentioned above) to due care with crystalline and fibrous materials.

Once the compound of Formula I has been prepared in a suitable form having the desired surface area per gram, it may be presented in any of the pharmaceutical preparations usually employed for presenting insoluble drugs. Suitable preparations include granules, tablets, biscuits, syrups, capsules, fondants, pellets, suspensions, pastes and draughts; and these may include the usual pharmaceutical excipients such as diluents, wetting agents, flavoring agents, binders and effervescing agents. For example, the drug may be used in the form of a 10% w./v. or 20% w./v. suspension in syrup and dispensed in single-dose containers.

The dosage schedule for administering a compound of Formula I depends on the body weight of the recipient (host) and also on the particular pox virus infection to be treated. For the prophylactic treatment of human small pox contacts, for example, in order to prevent smallpox developing in persons who have been in contact with the disease and who would normally be expected to contract it, the drug is preferably given in at least two doses each in the range of 0.5 to 5.0 g.

In a particular example [D. J. Bauer, Leone St. Vincent, C. Henry Kempe and A. W. Downie, "Prophylactic treatment of smallpox contacts with N-methylisatin β-thiosemicarbazone," The Lancet (September 7, 1963), 2, 494–496] 1-methylisatin β-thiosemicarbazone was employed in dosage schedules of (a) 1.5 g. by mouth twice daily after meals for 4 days, (b) 3.0 g. by mouth twice daily after meals for 4 days, and (c) two doses of 3.0 g. by mouth taken after meals and within a period of 12 hours. This proved to be a very effective treatment of smallpox infections during the incubation period and thus protected smallpox contacts who had never been vaccinated. In contacts who had had primary vaccination in the past it was more effective than revaccination, and it was effective when the contact was not detected soon enough for successful revaccination to offer any chance of protection. The 1-methylisatin β-thiosemicarbazone used in this study was a finely divided preparation having a surface area per gram of about 2–4 m.²/g.

The following examples illustrate the invention.

*Example 1.—1-methylisatin β-thiosemicarbazone*

16.1 g. 1-methylisatin and 9.1 g. thiosemicarbazide were heated under reflux in 200 ml. 50% aqueous ethanol for 30 minutes. The ethanol was removed by distillation in vacuo, and the residue was cooled, filtered, washed with hot water, and recrystallized from n-butanol to give the product, M.P. 245° C.

*Example 2.—Ethylisatin β-thiosemicarbazone*

23 g. sodium was dissolved in one liter of absolute ethanol, 147 g. isatin was added with shaking, and the mixture was heated under reflux for 15 minutes. 308 g. ethyl iodide was added, and heating under reflux continued for a further 12 hours. Ethanol and ethyl iodide were removed in vacuo. The residue was dissolved by heating under reflux in 2 liters of benzene, the solution was extracted with 2 liters of N-sodium hydroxide in two portions, and the alkaline solution was adjusted to pH 1 by addition of concentrated hydrochloric acid, when an oil separated. This was extracted with 2 liters of benzene in portions. The benzene solution was dried over anhydrous sodium sulfate, and the benzene removed in vacuo.

The residue (1-ethylisatin) was dissolved by heating under reflux in 500 ml. ethanol. A solution of 91 g. thiosemicarbazide in 500 ml. hot water was added, and the mixture heated under reflux for 30 minutes. Ethanol was removed in vacuo, and the residue was cooled and shaken to solidfy the product. This was filtered off and washed with hot water, suspended in 2 liters of distilled water at 80° C. with rapid stirring for 15 minutes, filtered off, and washed with distilled water. The residue was crystallized from 3 litres of n-propanol, decolorizing with charcoal, to give 150 g. 1-ethylisatin β-thiosemicarbazone, M.P. 204° C.

*Example 3.—1-n-propylisatin β-thiosemicarbazone*

The β-thiosemicarbazone, M.P. 193° C., was prepared from 1-n-propylisatin in a manner similar to that described in Example 1.

*Example 4.—1-n-butylisatin β-thiosemicarbazone*

Equivalent molecular proportions of 1-sodioisatin and n-butyl bromide were refluxed in benzene for 10 days. The liquid was filtered and the filtrate extracted with 2 N-sodium hydroxide. The extract was acidified with concentrated hydrochloric acid to give 1-n-busylisatin as an orange oil which solidified on standing, M.P. 36° C. The β-thiosemicarbazone, M.P. 155° C., was prepared from the isatin in a manner similar to that described in Example 1.

*Example 5.—1-n-pentylisatin β-thiosemicarbazone*

Equivalent molecular proportions of 1-sodioisatin and n-pentyl bromide were heated under reflux for 48 hours. The mixture was cooled and filtered. The filtrate was extracted with a small volume of 2 N-sodium hydroxide, and acidification of the alkaline extract with concentrated hydrochloric acid gave 1-n-pentylisatin, M.P. 47° C. The β-thiosemicarbazone, M.P. 184° C., was prepared from the isatin in a manner similar to that described in Example 1.

*Example 6.—1-isopropylisatin β-thiosemicarbazone*

1-isopropylisatin, M.P. about 62° C. (difficult to crystallize), and its β-thiosemicarbazone, M.P. 225° C., were similarly prepared.

*Example 7.—1-prop-2'-ynylisatin β-thiosemicarbazone*

1-prop-2'-ynylisatin, M.P. 163° C., and its β-thiosemicarbazone, M.P. 250° C. (decomp.), were similarly prepared.

Example 8.—1-allylisatin β-thiosemicarbazone 1-sodioisatin from 7.5 g. isatin and allyl bromide were heated under reflux in xylene for 2 hours. The mixture was filtered and extracted with 2 N-sodium hydroxide. The extract was cleared by ether extraction and treated with hydrochloric acid to precipitate red crystals of 1-allylisatin, M.P. 89° C.

This isatin was treated with an equivalent molecular proportion of thiosemicarbazide using the procedure of Example 1. The product crystallized from anhydrous ethanol in orange crystals, M.P. 201° C.

Example 9.—1-hydroxymethylisatin β-thiosemicarbazone

The β-thiosemicarbazone, M.P. 230° C., was prepared from 1-hydroxymethylisatin in a manner similar to that described in Example 1.

Example 10.—1-β'-hydroxyethylisatin 2-thiosemicarbazone

Equivalent molecular proportions of 1-sodioisatin and 2-chloroethanol were heated under reflux for 48 hours. The mixture was cooled and filtered. The filtrate was reduced to small volume, and 1-2'-hydroxyethylisatin separated on addition of petroleum ether (B.P. 60–80° C). It crystallized from aqueous methanol in orange needles, M.P. 118° C.

The isatin was treated with an equivalent molecular proportion of thiosemicarbazide using the procedure of Example 1. The product crystallized from aqueous methanol in bright orange needles, M.P. 247° C.

Example 11.—1-acetoxymethylisatin β-thiosemicarbazone 1-acetoxymethylisatin, M.P. 109° C., was obtained by the action of acetyl chloride on 1-hydroxymethylisatin in pyridine, and treated with thiosemicarbazide in aqueous ethanol to give the product, M.P. 230° C. when crystallized from n-butanol.

Example 12.—1-2'-acetoxyethylisatin β-thiosemicarbazone 1-2'-acetoxyethylisatin, M.P. 113° C., and its thiosemicarbazone, M.P. 244° C. (decomp.) when crystallized from aqueous ethanol, were similarly prepared from 1-2'-hydroxyethylisatin.

Example 13.—1-2'-bromoethylisatin β-thiosemicarbazone 1-sodioisatin was heated under reflux in excess 1,2-dibromoethane for 12 hours; the solvent was removed in vacuo and the residue extracted with hot benzene. The benzene solution was extracted with 2 N-sodium hydroxide, and acidification of the alkaline extract gave 1-2'-bromoethylisatin as orange plates, M.P. 131° C., when crystallized from methanol.

The β-thiosemicarbazone was obtained as orange needles, M.P. 227° C. (decomp.), when crystallized from n-butanol, by adding a methanolic solution of the isatin at 60° C. to an equimolar quantity of thiosemicarbazide in water at the same temperature.

Example 14.—1-acetylisatin β-thiosemicarbazone

The β-thiosemicarbazone, M.P. 244° C., was prepared from 1-acetylisatin in a manner similar to that described in Example 1.

Example 15.—5-fluoro-1-methylisatin β-thiosemicarbazone

Equimolar quantities of 5-fluoro-1-sodioisatin and methyl iodide were heated under reflux in ethanol for 48 hours. The mixture was filtered and the filtrate extracted with benzene. The benzene solution was extracted with 2 N-sodium hydroxide. Acidification with concentrated hydrochloric acid of the alkaline extract gave 5-fluoro-1-methylisatin as light red needles, M.P. 151° C. The β-thiosemicarbazone, M.P. 260° C. when crystallized from ethanol, was prepared from the isatin in a manner similar to that described in Example 1.

Example 16.—1-ethyl-5-fluoroisatin β-thiosemicarbazone 1-ethyl-5-fluoroisatin, red needles, M.P. 131° C. and its β-thiosemicarbazone, orange needles, M.P. 228° C., were prepared similarly from 5-fluoro-1-sodioisatin.

Example 17.—1,7-trimethyleneisatin β-thiosemicarbazone

Equimolar quantities of 1,7-trimethyleneisation (red plates, M.P. 191° C.) and thiosemicarbazide were heated under reflux in aqueous ethanol. The product was collected and washed well with hot water, and crystallized from ethanol as orange plates, M.P. 236° C.

Example 18.—1,7-diethylisatin β-thiosemicarbazone

The β-thiosemicarbazone, M.P. 256° C. (decomp.), was similarly prepared from 1,7-diethylisatin.

Example 19.—Tablets 1-ethylisatin β-thiosemicarbazone (250 parts) was triturated until the crystals were finely powdered, mixed with lactose (50 parts) and starch (30 parts), and granulated with 5% starch mucilage or with 10% aqueous alcohol gelatin solution. The moist mass was sifted through a sieve having 7.9 meshes/cm. The granules were dried at about 50° C. Magnesium stearate (1.5 parts) was added. The mixture was sifted through a sieve having 6.3 meshes/cm. and compressed on a suitable die to give tablets each containing 250 mg. of 1-ethylisatin β-thiosemicarbazone. Tablets containing the β-thiosemicarbazone of 1-methylisatin, 1-allylisatin, 1-2'-hydroxyethylisatin, 1-acetoxymethylisatin or 1-2'-acetoxyethylisatin were similarly prepared.

Example 20.—Capsules

Hard gelatin capsules were each filled with 250 mg. of the finely powdered β-thiosemicarbazone of 1-methylisatin, 1-ethylisatin, 1-n-propylisatin, 1-isopropylisatin, 1-n-butylisatin, 1-n-pentylisatin, 1-allylisatin, 1-prop-2'-ynylisatin, 1-hydroxymethylisatin, 1-2'-hydroxyethylisatin, 1-acetoxymethylisatin, 1-2'-acetoxyethylisatin, 1-2'-bromoethylisatin, 1-acetylisatin, 5-fluoro-1-methylisatin, 1-ethyl-5-fluoroisatin, 1,7-trimethyleneisatin or 1,7-diethylisatin.

Example 21.—Capsules

The dried granules, prepared in Example 19 and containing either 1-ethylisatin β-thiosemicarbazone or 1-methylisatin β-thiosemicarbazone were filled by means of a burette into hard gelatin capsules; each to contain 250 mg. of the active ingredient.

Example 22.—Aqueous suspension for intramuscular injection 1-ethylisatin β-thiosemicarbazone was sterilized by heatng at 160° C. for one hour. A sterile aqueous vehicle was made by autoclaving the following solution: benzyl alcohol (2%), sodium carboxymethylcellulose (2%), polyoxyethylene sorbitan monooleate (0.1%) and water for injection (to 100%). Using aseptic precautions throughout, the sterile drug (20%) was mixed with the sterile aqueous vehicle, and a fine suspension was prepared using a sterile ball mill.

Aqueous suspensions of the β-thiosemicarbazone of 1-methylisatin, 1-n-propylisatin, 1-isopropylisatin, 1-n-pentylisatin, 1-allylisatin, 1-prop-2'-ynylisatin, 1-hydroxymethylisatin, 1-2'-hydroxyethylisatin, 1-acetoxymethylisatin, 1-2'-acetoxyethylisatin, 1-acetylisatin, 5-fluoro-1-methylisatin, 1-ethyl-5-fluoroisatin, 1,7-trimethyleneisatin or 1,7-diethylisatin were similarly prepared.

Example 23.—Suspension for injection

Finely powdered 1-ethylisatin β-thiosemicarbazone was sterilized by heating for an hour at 160° C. in thin layers in a covered vessel, and arachis oil was sterilized by heating to 106° C. for one hour. Using aseptic precautions throughout, a suspension containing 200 mg. drug/ml.

was prepared as follows: the sterile arachis oil was added to the sterile drug in a sterile porcelain ball mill provided with porcelain balls, the mixture was milled until the drug was suitaby suspended in the arachis oil, and the suspension was transferred to suitable sterile ampoules or multidose containers which were sealed in the usual manner.

A similar suspension of 1-methylisatin β-thiosemicarbazone was prepared in the same way.

*Example 24.—Sterile eye ointment*

Finely powdered 1-ethylisatin β-thiosemicarbazone was sterilized by heating to 160° C. in thin layers for one hour. An ointment containing 5% of drug was prepared by mixing the sterile drug with sterile molten eye ointment basis (British Pharmacopoeia) and stirring aseptically until cool. The medicated eye ointment was packed in 4 g. lots in small sterilized collapsible tubes.

A similar ointment was made by triturating the sterile drug in a sterile mortar with a little sterile liquid paraffin, and then adding the sterile molten eye ointment basis and proceeding as described above.

Similar ointments were made containing the β-thiosemicarbazone of 1-methylisatin, 1-allylisatin, 1-2'-hydroxyethylisatin, 1-acetoxymethylisatin or 1-2'-acetoxyethylisatin.

*Example 25.—Microcrystals*

A 5% w./v. solution of 1-methylisatin β-thiosemicarbazone in dimethylformamide (20 ml.) was poured into water (80 ml.) to give a thick and stable suspension of microcrystals having a length of about 20–25μ and diameter up to 1μ.

*Example 26.—Comminuted material*

1-methylisatin β-thiosemicarbazone was dry-milled for a period of days in a conventional rod mill until the particles had a surface mean diameter of 1–2μ (corresponding to a surface area per gram of 2–4 m.²/g.).

*Example 27.—Suspension in syrup*

A 10% w./v. suspension of 1-methylisatin β-thiosemicarbazone in syrup was prepared by the usual pharmaceutical techniques according to the following formula:

| | G. |
|---|---|
| Finely divided 1-methylisatin β-thiosemicarbazone (2–4 m.²/g.) | 10.0 |
| Sucrose | 33.3 |
| Chloroform | 0.25 |
| Sodium benzoate | 0.4 |
| Sucrose distearate | 0.1 |
| Methyl p-hydroxybenzoate | 0.02 |
| Vanillin | 0.04 |
| Glycerol | 1.5 |
| Purified water, to 100.0 ml. | |

*Example 28.—Capsules*

A chewable gelatin capsule was prepared by mixing a syrup according to the following formula:

| | G. |
|---|---|
| Finely divided 1-methylisatin β-thiosemicarbazone (2–4 m.²/g.) | 33.33 |
| Methyl p-hydroxybenzoate | 0.1 |
| Flavoring agents such as vanilla, quantum sufficit | |
| 70% w./v. sorbitol syrup, to | 100.0 |

Portions of this syrup were then encapsulated using a flavored, chewable, soft gelatin base, so that each capsule contained 1.5 g. of 1-methylisatin β-thiosemicarbazone.

*Example 29.—Fondants*

Fondants in the form of cubes approximately 13 mm. across were prepared by the usual pharmaceutical techniques according to the following formula:

| | G. |
|---|---|
| Finely divided 1-methylisatin β-thiosemicarbazone (2–4 m.²/g.) | 40.0 |
| Glycerol | 7.0 |
| Flavoring agents such as apricot or pineapple synthetic flavoring, quantum sufficit | |
| Fondant base, to | 100.0 |

What we claim is:

1. A process for the prophylaxis against smallpox and treatment of infective complications and modification of severe vaccination reaction of vaccinia which comprises the administration in therapeutically acceptable form to the host of a therapeutically effective dosage of 1-methylisatin β-thiosemicarbazone.

2. A process as defined in claim 1 wherein the process is concerned with the prophylaxis against smallpox.

3. A process as defined in claim 1 wherein the process is concerned with vaccinia infections.

References Cited by the Examiner

UNITED STATES PATENTS

| | | | |
|---|---|---|---|
| 2,642,439 | 6/1953 | Coles | 260—325 |
| 3,076,815 | 2/1963 | Pugin | 260—325 |
| 3,086,911 | 4/1963 | Brown et al. | 167—65 |
| 3,088,871 | 5/1963 | Pfeiffer | 167—65 |

OTHER REFERENCES

Bauer, D. J., et al.: "Antiviral Chemotherapeutic Activity of Isatin-3-Thiosemicarbazone in Mice Infected With Rabbit Pox Virus," Nature, 184, supple. 19, pages 1496–7, Nov. 7, 1959.

Bauer, D. J.: "Antiviral and Synergistic Actions of Isatin Thiosemicarbazone and Certain Phenoxypyrimidines in Vaccinia Infection in Mice," Brit. J. Expt'l. Pathol., 36, pp. 105–114 (1955).

Bock, M.: "The Action of Thiosemicarbazone on the Experimental Smallpox Infection of the Mouse," Z. Hyg. Infektionskrankh, 143, pp. 480–9 (1957); abstracted in English in Chem. Abstracts, 51, 10748C (1957).

Minton, S. A., et al.: "Effect of Thiosemicarbazones and Dichlorophenoxythiouracil on Multiplication of a Recently Isolated Strain of Variola-Vaccinia Virus in the Brain of the Mouse," J. Immunol., 70, pp. 222–8 (1953); abstracted in Chem. Abstracts, 47, 5542D (1953).

Thompson, R. L., et al.: "Effect of Aliphatic Oximes and Isatin Thiosemicarbazones on Vaccinia Infection in the Mouse and Rabbit," Proc. Soc. Expt'l. Biol. Med., 84, pp. 496–9, 1953.

LEWIS GOTTS, *Primary Examiner.*

NICHOLAS S. RIZZO, *Examiner.*

MARY U. O'BRIEN, SHEP K. ROSE, *Assistant Examiners.*

UNITED STATES PATENT OFFICE
CERTIFICATE OF CORRECTION

Patent No. 3,253,991                                                          May 31, 1966

Denis John Bauer et al.

It is hereby certified that error appears in the above numbered patent requiring correction and that the said Letters Patent should read as corrected below.

Column 1, line 17, for "form" read -- form to --; column 4, line 8, for "-Ethylisatin", in italics, read -- 1-Ethylisatin --, in italics; line 48, for "1-n-busylisatin" read -- 1-n-butylisatin --; column 5, line 17, for "1-β'-hydroxyethylisatin", in italics, read -- 1-2'-hydroxyethylisatin --, in italics; line 18, for "2-thiosemicarbazone", in italics, read -- β-thiosemicarbazone --, in italics; column 6, line , for "1,7-trimethyleneisation" read -- 1,7-trimethyleneisatin --; line 54, for "heatng" read -- heating --; line 67, for "1.7-trimethyleneisatin" read -- 1,7-trimethyleneisatin --.

Signed and sealed this 29th day of October 1968.

(SEAL)
Attest:

EDWARD M. FLETCHER, JR.                                   EDWARD J. BRENNER
Attesting Officer                                               Commissioner of Patents